(12) United States Patent
Alberti et al.

(10) Patent No.: US 8,495,615 B2
(45) Date of Patent: *Jul. 23, 2013

(54) METHOD, SYSTEM AND COMPUTER PROGRAM FOR DISTRIBUTING SOFTWARE PATCHES

(75) Inventors: Enrica Alberti, Rome (IT); Mauro Arcese, Rome (IT); Gianluca Bernardini, Rome (IT); Rosario Gangemi, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/020,471

(22) Filed: Feb. 3, 2011

(65) Prior Publication Data
US 2011/0126187 A1 May 26, 2011

Related U.S. Application Data

(63) Continuation of application No. 11/383,288, filed on May 15, 2006, now Pat. No. 7,937,697.

(30) Foreign Application Priority Data

May 19, 2005 (EP) ..................................... 05104259

(51) Int. Cl.
*G06F 9/44* (2006.01)
(52) U.S. Cl.
USPC ........................................................ 717/172
(58) Field of Classification Search
USPC .............. 717/168–178, 120; 713/1, 182, 193, 713/201; 714/39; 726/25, 26; 705/1.1
See application file for complete search history.

(56) References Cited

U.S. PATENT DOCUMENTS

| | | | |
|---|---|---|---|
| 6,202,207 B1 * | 3/2001 | Donohue | 717/173 |
| 6,651,249 B2 | 11/2003 | Waldin et al. | |
| 7,356,679 B1 | 4/2008 | Le et al. | |
| 7,559,058 B2 | 7/2009 | Blumfield et al. | |
| 2003/0056116 A1 * | 3/2003 | Bunker et al. | 713/201 |
| 2004/0003266 A1 | 1/2004 | Moshir et al. | |
| 2005/0005129 A1 * | 1/2005 | Oliphant | 713/182 |
| 2006/0080656 A1 * | 4/2006 | Cain et al. | 717/174 |
| 2006/0101457 A1 * | 5/2006 | Zweifel et al. | 717/174 |
| 2006/0156032 A1 | 7/2006 | Panjwani | |

* cited by examiner

*Primary Examiner* — Tuan A Vu
(74) *Attorney, Agent, or Firm* — Garg Law Firm, PLLC; Rakesh Garg; Libby Z. Toub (57) ABSTRACT

A software patch management solution (200) is proposed. The devised solution is based on the idea of automating the installation of the patches through a software distribution infrastructure. For this purpose, an automation engine (225) is added to a distribution server (110). The automation engine interfaces with a patch provider (125) acting as a proxy, which stores a local copy of the patches (210) and of a patch catalogue (215) for detecting corresponding vulnerabilities. The automation engine automatically builds a distribution plan for deploying the patches to the relevant endpoints (115), according to a vulnerability catalogue (230) that stores the actual exposures of the endpoints. The distribution plan arranges the required activities in the correct order, so as to minimize the number of rebooting of the endpoints; the distribution plan ends with an activity for scanning the endpoints, so as to update the vulnerability catalogue accordingly.

18 Claims, 7 Drawing Sheets

METHOD, SYSTEM AND COMPUTER PROGRAM FOR DISTRIBUTING SOFTWARE PATCHES

FIELD OF THE INVENTION

The present invention relates to the data processing field. More specifically, the present invention relates to the maintenance of software products in a data processing system.

BACKGROUND ART

The maintenance of software products is a very complex and time-consuming activity in modern data processing systems. Particularly, a very important issue is the management of software patches (or fixes) that are continually published by the vendors of the software products to remedy corresponding problems temporarily. Indeed, problems are invariably found in every software product after it has been formally released (notwithstanding any previous beta-test or tryout distribution); this process is endless since even when the problems have been fixed by the corresponding patches new problems are discovered (if not even introduced by the same patches). The patch management process is very critical for problems that involve security vulnerabilities, which expose the system to malicious attacks, such as by hackers (also because those vulnerabilities are now public).

However, the patch management process is decidedly non-trivial; this is especially true in systems with distributed architecture, wherein several software products are installed on a high number of computers. Indeed, the patches are published very often (particularly for software products to be used on Personal Computers, such as based on the "Windows" platform by Microsoft Corporation); moreover, different patches are available for the same problem (for example, depending on the underlying software platform, on the installation language of the software product, and on the patches already installed). Therefore, the task of an administrator of the system (for maintaining the installed software products at the correct service level) is very complex.

For this purpose, the administrator may exploit software distribution applications that are available for facilitating the deployment of the software products from a central site to multiple target computers (or endpoints); indeed, the patches can be embedded into software packages and then distributed to the endpoints for their installation (as any other software product).

However, in this scenario no specific solution is known in the art for automating the patch management process. Therefore, the administrator herself/himself must trace the state of the different endpoints manually (to have a picture of the software products that are allegedly installed on them); the administrator must then interpret the available information, so as to decide which patches should be installed on which endpoints. Once the patches have been selected, the administrator builds the corresponding software packages (for the different types of software products that are available); the application of those software packages can now be enforced on the desired endpoints.

All of the above requires a series of manual operations by the administrator, which operations have a detrimental impact on the productivity and reliability of the patch management process. Moreover, the installation of the patches on the endpoints is not optimized (for example, the process may involve repeating the same operation more times or performing operations that are not necessary). In any case, it is very difficult to ensure the correct order of application of the patches.

A further drawback of the solutions known in the art is that any reporting of the level of compliance of the endpoints to a predefined security standard must be done manually. Therefore, the process is error prone and the results obtained are quite unreliable.

SUMMARY OF THE INVENTION

According to the present invention, a solution for automating the distribution of the patches is suggested.

Particularly, an aspect of the present invention proposes a method for maintaining a set of (one or more) software products installed on a plurality of code execution entities (or endpoints). The method includes the step of providing a set of (one or more) software patches; each patch is intended to correct at least one problem (by modifying at least one software product). The method continues selecting a subset of the patches (from none to all of them), together with one or more target entities for each selected patch; the operation is performed according to a (vulnerability) catalogue, which provides an indication of the exposure to the problems by each entity. A distribution plan is then built; for each selected patch the distribution plan includes an activity, which is intended to apply a software package on the corresponding target entities (with the selected patch that is installed when the software package is applied). The distribution plan is then submitted for execution. The method continues causing each entity to be scanned, in order to determine the corresponding exposure to the problems. The vulnerably catalogue is then updated according to the result of the scanning.

In a preferred embodiment of the invention, the software packages relating to serial patches (i.e., requiring a deferrable rebooting of each target endpoint) are applied by rebooting the target endpoint only once after their installation.

In a further embodiment of the invention, the rebooting conditions the activities for applying the software packages relating to exclusive patches (i.e., requiring an immediate rebooting of each target endpoint).

As an additional enhancement, the rebooting is replaced by the one that is performed at the end of the application of the first software package relating to the exclusive patches.

In a preferred implementation, the distribution plan includes another activity for scanning all the endpoints after the application of the different software packages.

A way to further improve the solution is to determine the target endpoints for each activity by running a corresponding query on the vulnerability catalogue when the distribution plan is submitted.

In an advantageous embodiment of the invention, any patch that is superseded by another patch is automatically discarded.

In a further advantageous embodiment of the invention, any patch that is embedded in another (cumulative) patch is likewise discarded.

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description,

DETAILED DESCRIPTION

Figure 1A:
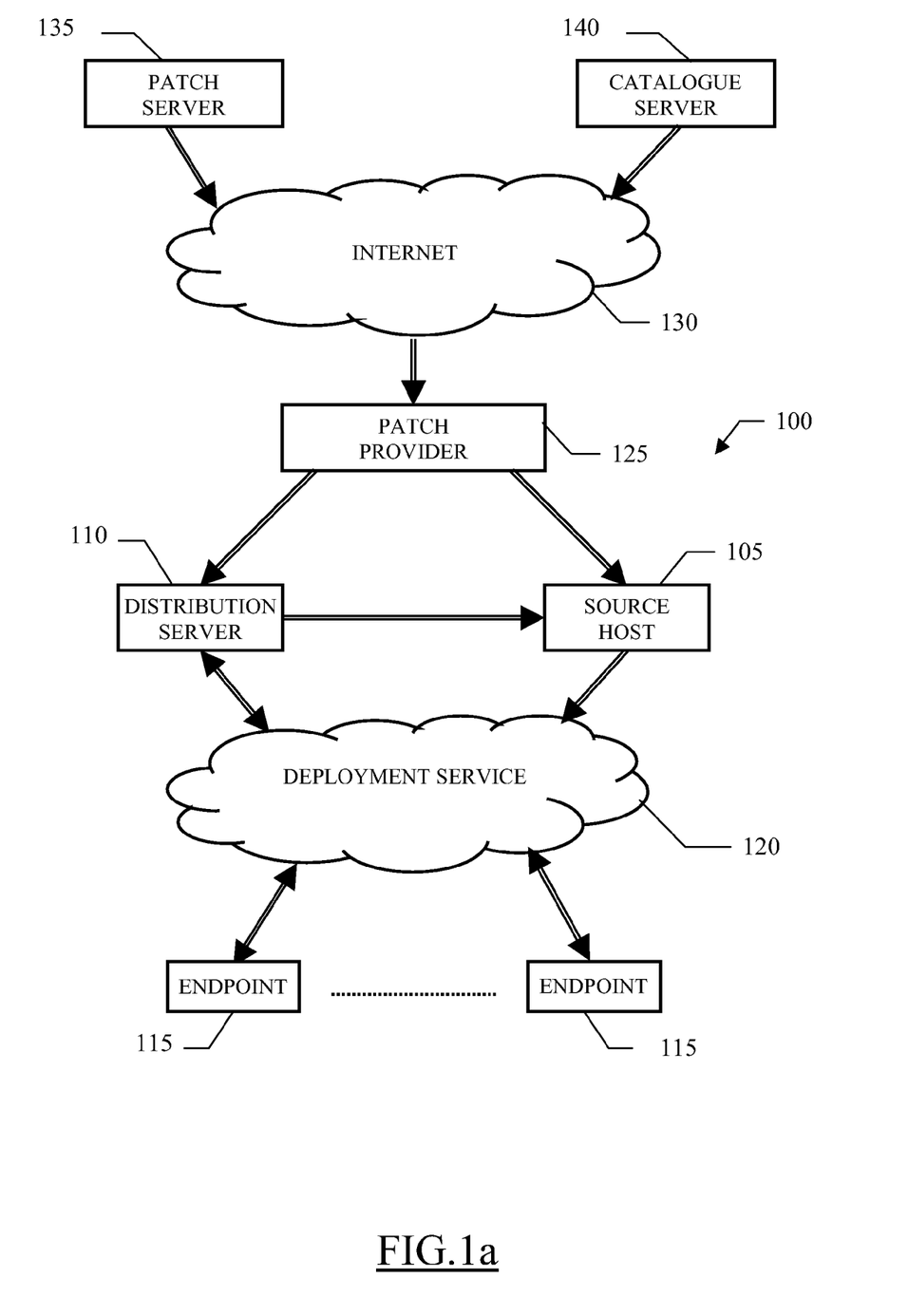
FIG. 1a is a schematic block diagram of a data processing system in which the solution according to an embodiment of the invention is applicable.

With reference in particular to FIG. 1a, a data processing system 100 with distributed architecture is illustrated.

The system 100 includes a software distribution infrastructure (for example, based on the "IBM Tivoli Configuration Manager or ITCM" application by IBM Corporation). Particularly, a source host 105 operates as a preparation and testing central site for software products (such as application programs) to be distributed throughout the system 100. The software distribution process is controlled by a server 110, which enforces the distribution of the software products to multiple endpoints 115. For this purpose, the source host 105, the distribution server 110 and the endpoints 115 exploit a deployment service 120 (for example, based on the "Multiplexed Distribution or MDIST2" framework by IBM Corporation); the deployment service 120 is implemented by one or more levels of gateways, which act as depots (or repeaters) for the information to be deployed.

The source host 105 and the distribution server 110 also access a patch provider 125. The patch provider 125 acts as a proxy, which stores a local copy of the information required for implementing a patch management process (required for maintaining the software products that are installed on the endpoints 115 at a desired service level). For this purpose, the patch provider 125 is connected to a global network 130 (typically the Internet). In this way, the patch provider 125 can access a patch server 135 and a catalogue server 140. The patch server 135 (for example, based on the "Microsoft Windows Server Update Services or SUS" technology by Microsoft Corporation) publishes bulletins that specify patches made available by a vendor of the software products together with their definition; on the other hand, the catalogue sever 140 publishes a patch catalogue that is used to discover any risk caused by the missing installation of those patches (such as the file "mssecure.cab" in the example at issue).

Typically, each patch definition includes its code with relevant installation parameters. More specifically, the patch consists of a small piece of code (in executable form) that is intended to remedy a problem (or bug) of the corresponding software product temporarily; for example, the patch can be used to prevent a security vulnerability or to correct a wrong behavior. The patches are designed to be inserted into the executable code of the software products directly, so as to provide an immediate solution to their problems; the patches may then be eventually incorporated permanently into new versions of the software products at their next release. The patches can be either specific or cumulative. A specific patch addresses a single problem, which is critical and must be fixed as soon as possible; on the other hand, a cumulative patch (or service pack) addresses multiple problems that are less severe (and then can be solved periodically). It should be noted that the same problem might be addressed by more patches (for example, a specific patch that was issued immediately after its discovery and a cumulative patch that was issued later, or a patch that supersedes a previous one). The installation parameters of each patch specify the software platform and the installation language of the software product to which the patch relates. Moreover, the installation parameters also allow inferring the type of the patch. Typically, the patch can be standard, serial or exclusive. A standard patch does not require any rebooting for its installation. Conversely, a serial or exclusive patch requires a rebooting to make it effective. More specifically, in a serial patch the rebooting may be deferred (with the software product that continues working properly); in this case, the patch is placed in a staging area of the hard-disk so as to become effective at the next restart. On the other hand, in an exclusive patch the rebooting must be performed immediately (since the software product is left in an inconsistent condition).

The patch catalogue lists all the patches that are available. Each patch is associated with an installation signature and a necessity signature. The installation signature consists of an expression based on one or more conditions (for example, the availability of a generic software module, the value of a configuration parameter, and the like), which indicates that the patch is installed when evaluated to true. The necessity signature consists of another expression that allows determining whether the patch is actually required (when it is not installed); for example, the patch may be not necessary if the corresponding software product is not available.

Figure 1B:
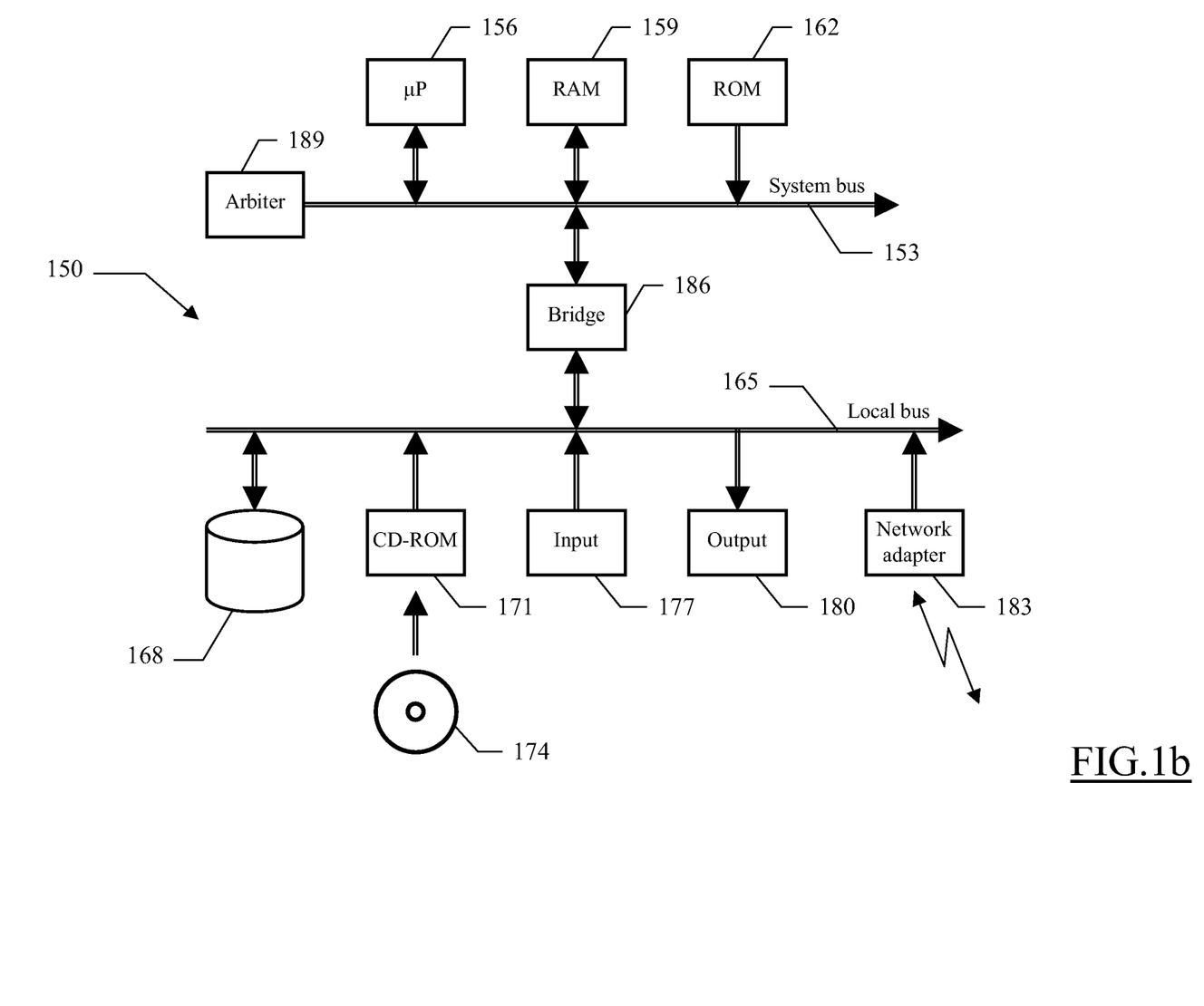
FIG. 1b shows the functional blocks of an exemplary computer of the system.

As shown in FIG. 1b, a generic computer of the system (source host, software distribution server, endpoint, patch provider, patch server and catalogue server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). An adapter 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
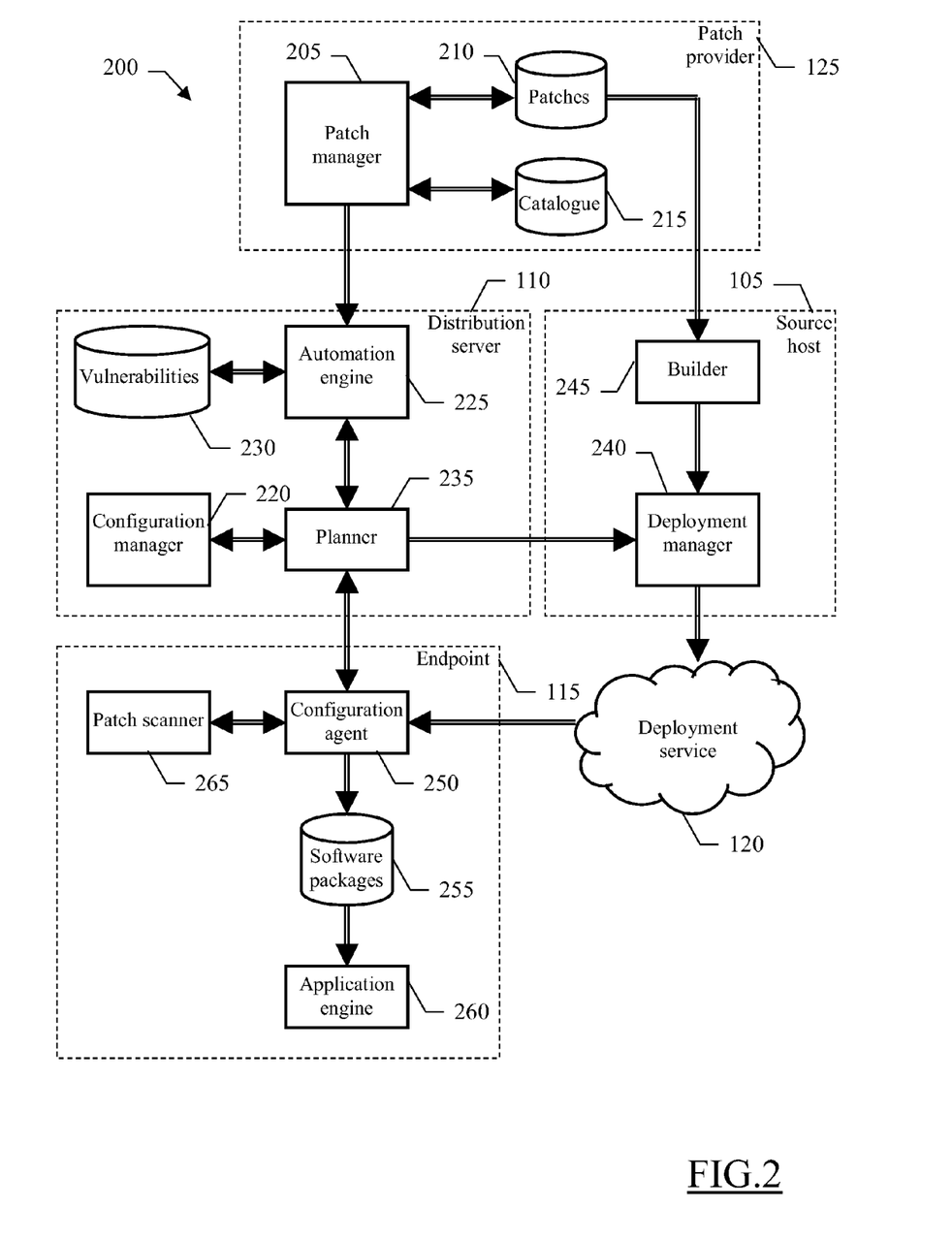
FIG. 2 depicts the main software components that can be used for implementing the solution according to an embodiment of the invention.

Considering now FIG. 2, the main software components that run on the above-described system are denoted as a whole with the reference 200. The information (program and data) is typically stored on the hard-disks and loaded (at least partially) into the corresponding working memories when the program is running. The program is initially installed onto the hard-disks, for example, from CD-ROMs.

With reference in particular to the patch provider 125, a patch manager 205 downloads a local copy of the patch definitions (i.e., their code and installation parameters) and a local copy of the patch catalogue from the corresponding servers (not shown in the figure). The patch definitions and the patch catalogue are cached into a repository 210 and a repository 215, respectively. Preferably, the (local) patch definitions 210 and the (local) patch catalogue 215 consist of subsets of the available information that is published by the vendor of the software products (for example, only relating to the relevant software platforms and installation languages). The patch manager 205 also allows an administrator of the system to select approved patches to be installed (among all the available ones).

Moving now to the software distribution server 110, a configuration manager 220 (such as the "Change Manager or CM" service of the above-mentioned ITCM) controls the generation of distribution plans for installing desired software products on selected target endpoints; for example, the operation may be performed according to predefined reference models (defining the desired state of subscribing endpoints identified by their role), or in response to specific requests entered through a command line interface. Typically, each distribution plan consists of a list of activities to be executed on the target endpoints; the activities can be either of the configuration type or of the inventory type. An activity of the configuration type causes the application of a software package that is provided by the source host 105 on each target endpoint. The software package represents the basic element of the software distribution process, which element is used to enforce a corresponding software product (i.e., to install, remove or update it). The software package consists of an instruction section that defines the actions to be performed on the target endpoint for enforcing the desired software product, and a data section that contains an image of any required resources (such as executable modules, configuration files, databases, icons, and the like). Some actions can be conditioned by one or more parameters to be resolved at run-time (according to selections entered by an end-user of the target endpoint or to its current configuration). On the other hand, an activity of the inventory type causes the scan of each target endpoint for detecting information about its current state (for example, the software products that are installed). Some activities of the plan can also be conditioned to the completion of other (prerequisite) activities, either at the global level or at the level of a single endpoint.

The distribution server 110 also includes an automation engine 225, which interfaces with the patch manager 205 (on the patch provider 125). The automation engine 225 retrieves the available information (patch definitions and patch catalogue) for the patches that have been approved from the corresponding repositories 210 and 215 (through the patch manager 205). As it will be apparent in the following, the automation engine 225 generates a corresponding distribution plan for installing the approved patches (simply referred to as patches from now on). For this purpose, the automation engine 225 accesses a vulnerability catalogue 230; for each endpoint, the catalogue 230 lists its exposures to the problems of the (approved) patches (for example, in the form of the patches that should be required).

The distribution plans so obtained are submitted (by the configuration manager 220 or by the automation engine 225) to a planner 235 (such as the "Activity Planner Manager or APM" service of the above-mentioned ITCM). The planner 235 controls the execution of the desired activities on the target endpoints. For this purpose, the planner 235 causes a deployment manager 240 running on the source host 105 to make available the required software packages. Particularly, the deployment manager 240 requests a builder 245 to retrieve or to generate dynamically the software packages for the patches by using the corresponding images (i.e., the code) that are already available locally (or are downloaded from the corresponding repository 210 on the patch provider 125 if necessary). The software packages are then uploaded to a depot of the deployment service 120 associated with the source host 105; this depot in turn distributes the software packages to further depots associated with the target endpoints.

Each target endpoint 115 (only one shown in the figure) includes a configuration agent 250, which periodically verifies the availability of any software package on its depot of the deployment service 120. The configuration agent 250 downloads each available software package (denoted with 255). The configuration agent 250 also receives commands directly from the planner 235 (on the distribution server 110) for enforcing any inventory activity. The software packages 255 received on the target endpoint 115 are supplied to an application engine 260 (such as the "Software Installation Engine or SIE" service of the above-mentioned ITCM). The engine 260 enforces the application of the software packages 255 on the target endpoint 115.

In addition, the configuration agent 250 directly drives a patch scanner 265 (such as the "Microsoft Baseline Security Analyzer or MBSA" by Microsoft Corporation). The module 265 scans the target endpoint 115 to determine all the patches that are still required on it (in response to a specific command from the planner 235 including a copy of the relevant portion of the patch catalogue). The result of this scan is returned to the planner 235 (through the configuration agent 250), so as to allow the automation engine 225 to update the vulnerability catalogue 230 accordingly.

The above-described implementation is based (with some modifications) on the structure proposed in WO-A-003085513, the entire disclosure of which is herein incorporated by reference.

Figure 3:
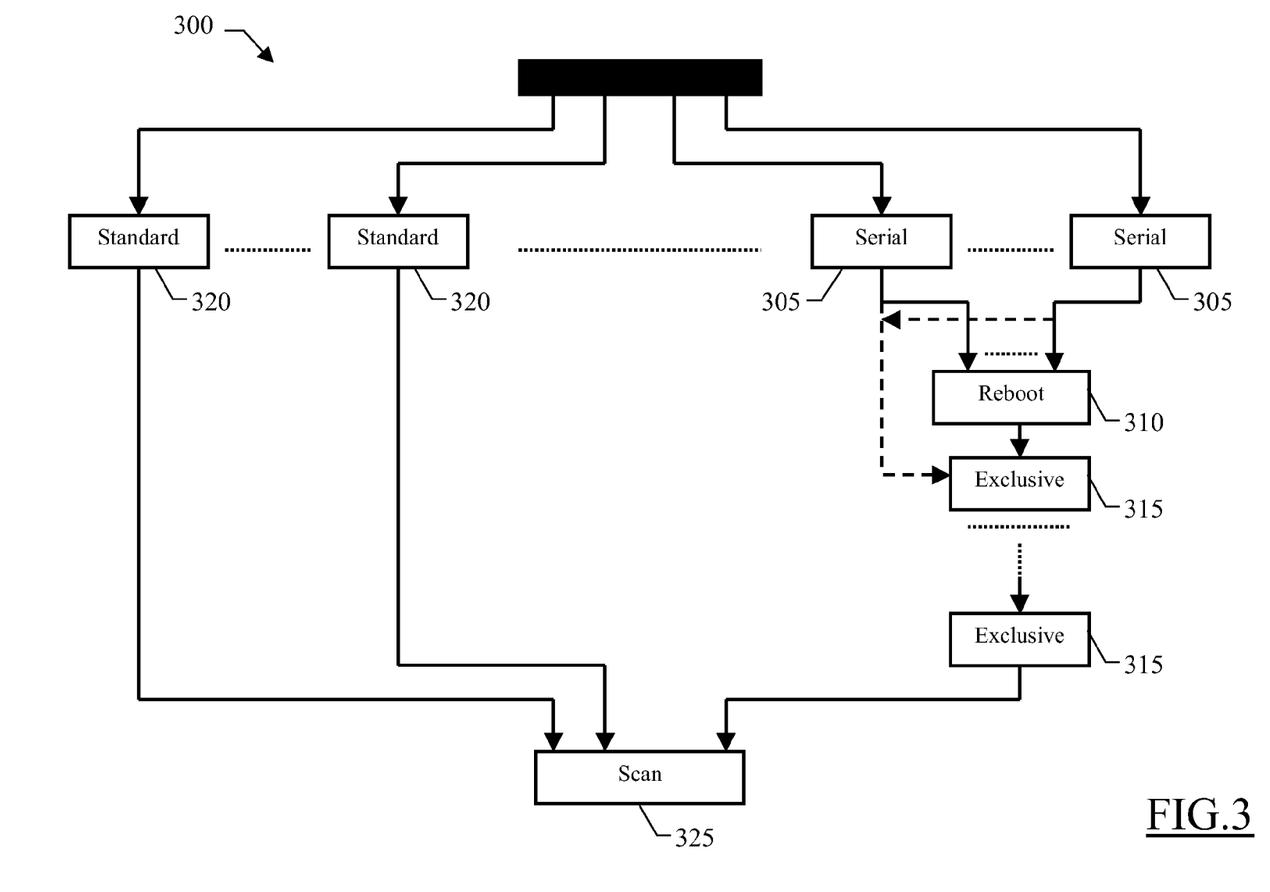
FIG. 3 illustrates a logical view of an exemplary distribution plan generated by the solution according to an embodiment of the invention.

A logical view of an exemplary distribution plan that is generated by the automation engine (for installing the desired patches) is shown in FIG. 3. As can be seen, all the activities causing the installation of the software packages for the serial patches (denoted with 305) are grouped together (possibly conditioned to each other according to their installation parameters). Each one of those software packages ends with an action of rebooting the target endpoints; normally, this action would be conditioned by a selection entered by the end-user of each target endpoint (which can decide to perform the rebooting immediately or to defer the activation of the corresponding serial patch to the next restart of the target endpoint); in this case, however, the software package is built by setting a corresponding run-time parameter that disables the rebooting action.

The activities 305 condition an activity 310 causing the rebooting of the target endpoints. In this way, the rebooting is executed only once after all the serial patches have been installed; as a result, the number of rebooting of the target endpoints is reduced to the minimum.

The activity 310 in turn conditions all the activities causing the installation of the software packages for the exclusive patches (denoted with 315); these activities are in turn conditioned to each other in succession, so as to ensure that the installation of each exclusive patch is performed alone. In this case (as sketched by the dashed arrows in the figure), it is also possible to have the activities 305 condition the first one of the activities 315; as a result, the rebooting that is always performed at the end of the installation of the corresponding exclusive patch replaces the one of the activity 310 (thereby further reducing the total number of rebooting that are required).

At the same time, all the activities causing the installation of the software packages for the standard patches (denoted with 320) are executed in a completely asynchronous manner (possibly conditioned to each other according to their installation parameters).

The plan ends with an activity 325, which causes the scan of all the endpoints of the system for detecting their vulnerabilities (i.e., the patches that are still required).

Figure 4A:
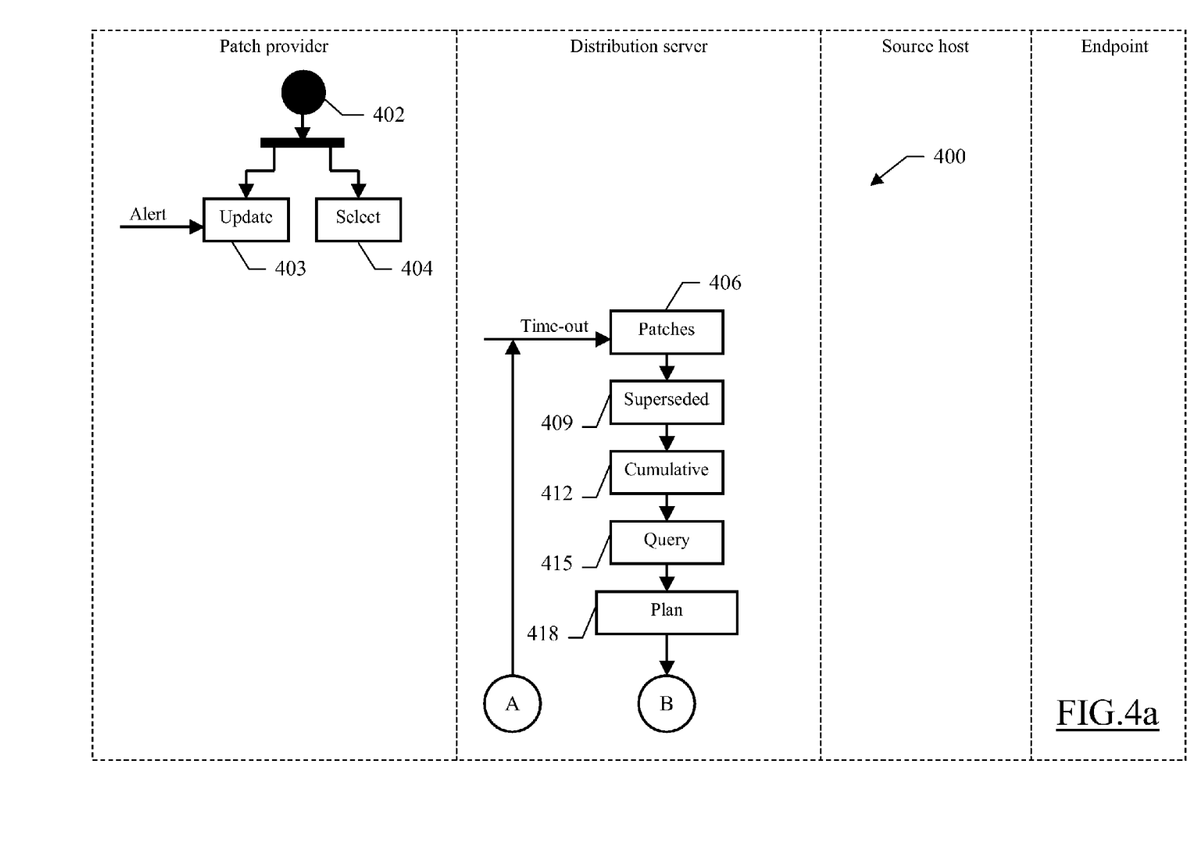
FIGS. 4a-4c show a diagram describing the flow of activities relating to an implementation of the solution according to an embodiment of the invention.
Figure 4B:
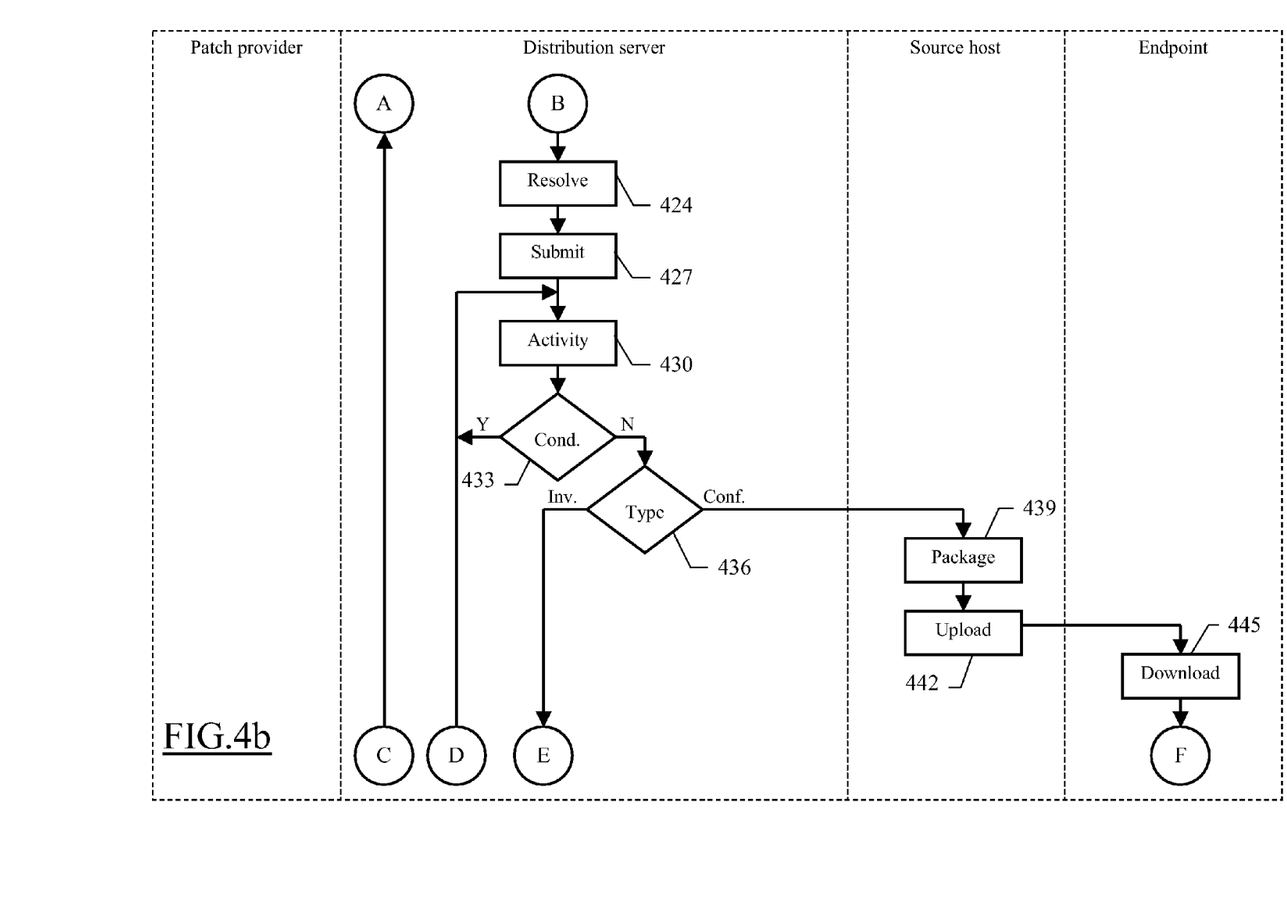
Figure 4C:
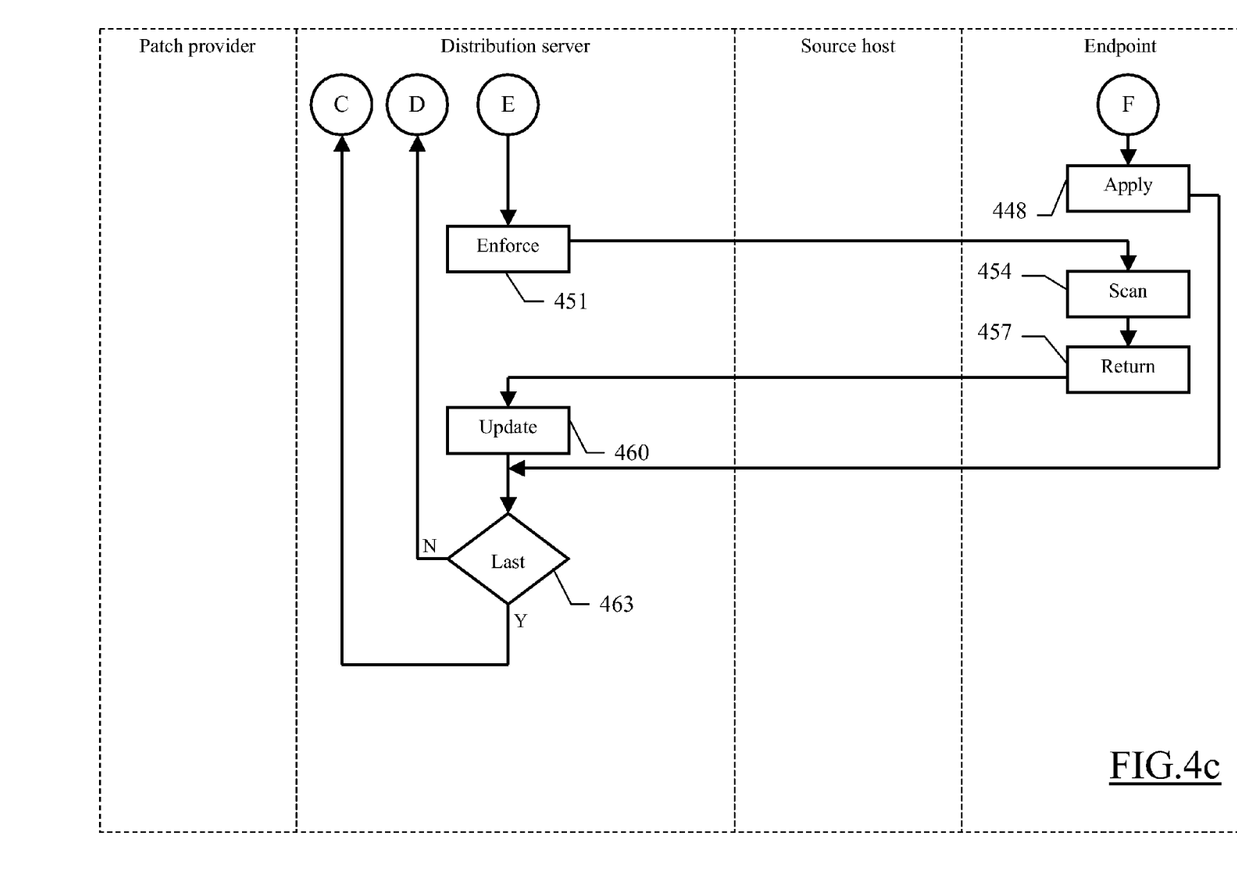

Moving now to FIGS. 4a-4c, the logic flow of an exemplary maintenance process that can be implemented in the above-described system is represented with a method 400. The method 400 starts at the black start circle 402 in the swim-lane of the patch provider, and then forks into two blocks that are executed in a completely asynchronous way. Particularly, the block 403 is entered in response to any change in the information that is published by the vendor (for example, detected by means of an alert service); in this phase, the patch manager synchronizes its local copy of the patch definitions and of the patch catalogue (for the relevant software platforms and installation languages) with the available information (i.e., downloading any new patch and/or deleting any old patch that is not valid any longer). At the same time, the administrator at block 404 may edit the list of the approved patches at will (for example, adding new patches once they have been successfully tested).

Moving now to the swim-lane of the distribution server, a loop is executed periodically at predefined time intervals (for example, every day). The loop begins at block 406 as soon as a corresponding time-out expires; in this phase, the automation engine retrieves the patch definitions and the patch catalogue for the (approved) patches. Proceeding to block 409, the automation engine discards any patch that is superseded by a next patch. Likewise, any patch for a problem that is addressed by a (next) cumulative patch as well is discarded at block 412. In this way, it is possible to avoid the repetition of operations that are useless (if not potentially dangerous).

The method then descends into block 415, wherein for each (remaining) patch the automation engine creates a query to be run on the vulnerability catalogue for identifying the endpoints that require the installation of the same patch (according to the corresponding information that is available in the patch catalogue). Continuing to block 418, the automation engine generates a new distribution plan for installing those patches. As explained above, the distribution plan will include the activities for applying the corresponding software packages in the correct order, together with the associated queries; for example, this result can be achieved by exploiting a specific naming convention of the software packages defining their type.

The distribution plan so obtained is then ready to be executed. For this purpose, the planner at first runs every query on the vulnerability catalogue so as to determine the corresponding target endpoints. In this way, the query is resolved at run-time (only when the distribution plan is actually submitted); as a result, any modification that should have occurred after its building is automatically taken into account. Continuing the block 427, the real plan including the activities (with the corresponding target endpoints) to be actually carried out is then obtained. If the administrator authorizes its execution (for example, because the involved activities are acceptable and do not impair the correct operation of the system), the distribution plan in now submitted.

For this purpose, a loop is executed for enforcing the application of each activity of the distribution plan; the loop begins at block 430, wherein a current activity of the distribution plan is extracted (starting from a first one defining its entry point). A test is now made at block 433 to determine whether the (current) activity is conditioned to other activities that have not been completed yet. If so, the flow of activity returns to block 430 for processing a next activity of the distribution plan. Conversely, the method 400 branches at decision block 436 according to the type of the activity to be executed. Particularly, if the activity is of the configuration type the blocks 439-448 are executed, whereas if the activity is of the inventory type the blocks 451-460 are executed; in both cases, the method 400 then joints at block 463.

Considering now block 439 (configuration activity), the planner instructs the source host to make the corresponding software package available. Continuing to block 442, the software package is uploaded to the associated depot of the deployment service. Moving to block 445 in the swim-lane of a generic target endpoint of the activity, the configuration agent downloads this software package. The corresponding engine then applies the software package on the target endpoint at block 448; this causes the installation of the respective patch.

Referring instead to block 451 (inventory activity), the planner enforces the execution of the activity on the corresponding target endpoints directly. In the example at issue, the distribution plan ends with an activity for scanning all the endpoints of the system; in response thereto, the operation is performed at block 454 on the same target endpoint (using the copy of the relevant portion of the patch catalogue that is transmitted by the distribution server together with the corresponding command). For this purpose, the scan engine evaluates the necessity signature of each patch of the catalogue (so as to determine whether the patch is required on the target endpoint); in this way, any new vulnerability is promptly detected. Passing to block 457, the list of the patches that would be required on the target endpoint, i.e., the ones for which the corresponding necessity signatures evaluated to true, is returned to the distribution server. Moving to block 460 in the swim-lane of the distribution server, the vulnerability catalogue is updated according to the result of the scan.

A test is now made at block 463 to determine whether the last activity of the distribution plan has been completed. If not, the flow of activity returns to block 430 for executing a next activity. At the same time, any pending activity waiting for the completion of the current one is resumed (block 433); therefore, in the example at issue once the activity for installing the last serial patch has been completed the activity for rebooting the target endpoints is executed, once that activity has been completed the activities for installing the exclusive patches are executed in succession, and once the activities for installing all the patches have been completed the activity for scanning the endpoints is executed. Conversely, when the whole plan has been executed the method 400 returns to block 406 for repeating the same operations continually (as soon as the time-out expires).

It should be noted that in this way the vulnerability catalogue provides no information about any new (approved) patch that is published after the scanning of the endpoints (so that the necessity of installing such patch is missed). However, this is not a problem in most practical situations since the process of approving the new patch generally takes a quite long time (such as for its testing); as a result, one or more further scanning of the endpoints (detecting the corresponding vulnerabilities) will be always performed before the administrator decides to approve the patch for installation. Likewise, at the beginning of the process the vulnerability catalogue is empty, so that no patch will be installed at the first iteration of the above-described loop; however, the submission of the first plan (in this case only consisting of the activity for scanning the endpoints) will populate the vulnerability catalogue so as to allow the correct operation of the method at the next iteration.

The above-described method provides an efficient solution for automating the patch management process. Indeed, once the administrator has selected the approved patches to be installed, all the operations of deciding which patches should be installed on which target endpoints, of retrieving the corresponding software packages, and of deploying them to the target endpoints do not require any manual intervention. All of the above has a beneficial impact on the productivity and reliability of the patch management process.

In addition, the process is now based on the content of the vulnerability catalogue, which reflects the actual state of all the endpoints in the system. This ensures the automatic compliance of the endpoints to the desired service level; it should be noted that the result is achieved with a process that is based on an autonomic approach (since the system self-adapts to the required target state).

At the same time, it is now also possible to certify the security standard of the system automatically; in this way, the results obtained are very accurate and reliable.

It is emphasized that the above-described approach substantially differs from the one that is used by the configuration manager to maintain information about the compliance of the endpoints to the different reference models. Indeed, in the latter case for each endpoint the configuration manager simply stores the state of the applied software packages; however, this information may differ from the actual configuration of the endpoint (for example, because some operations have been performed out of the control of the configuration manager). On the contrary, the vulnerability catalogue is based on the scan of the endpoints. Moreover, the information that is available to the configuration manager is focused on the application of the required software packages. The vulnerability catalogue is instead focused on the exposures of the endpoint to the problems, and not on the available approved patches (for example, a problem that is not fixed is always detected irrespective of the fact that the corresponding patch seems to have been correctly installed); in other words, the proposed solution inverts the logic of operation with respect to the configuration manager (requirements versus configurations).

Naturally, in order to satisfy local and specific conditions, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the program or a part thereof to reduce the accesses to the mass memory during execution); in any case, it is possible to replace the computer with any code execution entity (such as a PDA, a mobile phone, and the like).

Moreover, the invention has equal applicability for installing patches addressing whatever kind of software products (such as operating systems, multimedia tools, and the like). Likewise, the use of any other software distribution infrastructure is within the scope of the invention.

Even though in the preceding description reference has been made to a specific architecture of the system, this is not to be intended as a limitation (for example, it is possible to collapse the distribution server, the source host and/or the patch provider into a single computer, to have a single server providing both the patch definitions and the patch catalogue, or to have the automation engine access the patch server and the catalogue server directly without any patch provider acting as a proxy).

In any case, the proposed solution is not tied to a specific vendor (with the corresponding patch catalogue format); conversely, it is possible to plug-in any other module that is customized for a different vendor (assuming that a well-defined interface is exposed).

The proposed structure of the vulnerability catalogue is also merely illustrative; more generally, any equivalent memory structure storing an indication of the exposures to the (known) problems by each endpoint is feasible.

A different arrangement of the activities in the distribution plan is not excluded (provided that it ensures the correct order of installation of the patches); for example, it is possible to swap the installation of the serial patches and the installation of the exclusive patches (with the corresponding dependencies that are reversed). Moreover, the different activities may be conditioned to the completion of the preceding ones on each target endpoint individually (instead of on all the target endpoints).

Alternatively, a manual scan of the endpoints is performed to initialize the algorithm; moreover, the last activity of the plan may scan the target endpoints only (with all the endpoints of the system that are scanned periodically in a completely asynchronous manner).

In a different embodiment of the invention, it is also possible to update the content of the vulnerability catalogue just before submitting any distribution plan (so as to ensure that the results of the queries associated with its activities do reflect the real state of the endpoints at the moment). However, without departing from the principles of the invention, the target endpoints for each activity may be determined statically at the building time of the distribution plan.

More sophisticated algorithms for selecting the patches to be deployed are also feasible (for example, based on optimization techniques for minimizing the impact of the process on the system). In any case, the solution according to the present invention lends itself to be implemented even without removing the patches that are superseded by and/or embedded into other patches (for the generation of the corresponding distribution plan).

Similar considerations apply if the program is structured in a different way, or if additional modules or functions are provided; likewise, the different memory structures may be of other types, or may be replaced with equivalent entities (not necessarily consisting of physical storage media). Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the present invention lends itself to be carried out with a hardware structure (for example, integrated in chips of semiconductor material), or with a combination of software and hardware.

The invention claimed is:

1. A method for maintaining a set of software products installed on a plurality of code execution target entities, the method including the steps of:
   providing a set of software patches via an automation engine acting as a proxy for a patch provider, each software patch in the set correcting at least one problem by modifying at least one software product;
   selecting a subset of the patches and at least one target entity for each selected patch according to a vulnerability catalogue using the automation engine, the vulnerability catalog being maintained external to the code execution target entities and providing a listing that a target entity is exposed to a problem corrected by a software patch, the listing indicating a nature of the problem to which the target entity is exposed, the listing identifying that the software patch should be applied to the target entity;
   building a distribution plan using the automation engine, wherein for each selected patch the distribution plan includes an activity for applying a software package on the corresponding target entities, the software package installing the selected patch when applied, wherein at least one of the selected patches is a serial patch requiring a deferrable rebooting for installation, for such at least one of the selected patches, the step of building the distribution plan further including:
      for each serial patch, adding an activity for applying a corresponding serial software package without rebooting a corresponding target entity; and
      adding an activity for rebooting the target entity in response to the application of all the serial software packages;
   submitting the distribution plan for execution, causing each entity to be scanned for determining whether each entity is exposed to a problem corrected by any of the selected subset of patches; and
   updating the vulnerability catalogue according to the result of the scanning.

2. The method according to claim 1, wherein at least one of the selected patches is an exclusive patch requiring an immediate rebooting for the installation, the step of building the distribution plan further including:
   for each exclusive patch, adding an activity for applying a corresponding exclusive software package in response to said rebooting.

3. The method according to claim 2, wherein the activity for rebooting is included in the activity for applying the first exclusive software package in the distribution plan.

4. The method according to claim 1, wherein the step of building the distribution plan further includes:
   adding a further activity for performing said scanning in response to the application of all the software packages.

5. The method according to claim 1,
   wherein the step of building the distribution plan further includes, for each selected patch, generating a query associated with the selected patch configured to extract from the vulnerability catalog a target entity exhibiting exposure to a problem corrected by the selected patch, and
   wherein the step of submitting the distribution plan includes running the query for each selected patch.

6. The method according to claim 1, wherein at least one of the selected patches is superseded by a further selected patch, the step of building the distribution plan further including:
   discarding the at least one superseded selected patch.

7. The method according to claim 1, wherein at least one of the selected patches is embedded in a still further selected patch, the step of building the distribution plan further including:
   discarding the at least one embedded selected patch.

8. The method according to claim 1, wherein the nature of the problem to which the target entity is exposed is a vulnerability due to a gap in data security at the target entity.

9. A computer program in a computer readable non-transitory storage medium for maintaining a set of software products installed on a plurality of code execution target entities, comprising:
   computer usable code for providing a set of software patches via an automation engine acting as a proxy for a patch provider, each software patch in the set correcting at least one problem by modifying at least one software product;
   computer usable code for selecting a subset of the patches and at least one target entity for each selected patch according to a vulnerability catalogue, the vulnerability catalog being maintained external to the code execution target entities and providing a listing that a target entity is exposed to a problem corrected by a software patch, the listing indicating a nature of the problem to which the target entity is exposed, the listing identifying that the software patch should be applied to the target entity;
   computer usable code for building a distribution plan using the automation engine, wherein for each selected patch the distribution plan includes an activity for applying a software package on the corresponding target entities, the software package installing the selected patch when applied, wherein at least one of the selected patches is a serial patch requiring a deferrable rebooting for installation, for such at least one of the selected patches, the step of building the distribution plan further including:
      for each serial patch, adding an activity for applying a corresponding serial software package without rebooting a corresponding target entity; and
      adding an activity for rebooting the target entity in response to the application of all the serial software packages;
   computer usable code for submitting the distribution plan for execution, causing each entity to be scanned for determining whether each entity is exposed to a problem corrected by any of the selected subset of patches; and
   computer usable code for updating the vulnerability catalogue according to the result of the scanning.

10. The computer program according to claim 9, wherein at least one of the selected patches is an exclusive patch requiring an immediate rebooting for the installation, the step of building the distribution plan further including:
   for each exclusive patch, adding an activity for applying a corresponding exclusive software package in response to said rebooting.

11. The computer program according to claim 10, wherein the activity for rebooting is included in the activity for applying the first exclusive software package in the distribution plan.

12. The computer program according to claim 9, wherein the step of building the distribution plan further includes:

adding a further activity for performing said scanning in response to the application of all the software packages.

13. The computer program according to claim 9, wherein the step of building the distribution plan further includes, for each selected patch, generating a query associated with the selected patch configured to extract from the vulnerability catalog a target entity exhibiting exposure to a problem corrected by the selected patch, and wherein the step of submitting the distribution plan includes running the query for each selected patch.

14. The computer program according to claim 9, wherein at least one of the selected patches is superseded by a further selected patch, the step of building the distribution plan further including discarding the at least one superseded selected patch.

15. The computer program according to claim 9, wherein at least one of the selected patches is embedded in a still further selected patch, the step of building the distribution plan further including discarding the at least one embedded selected patch.

16. The computer program according to claim 9, wherein the nature of the problem to which the target entity is exposed is a vulnerability due to a gap in data security at the target entity.

17. A data processing system for maintaining a set of software products installed on a plurality of code execution target entities, comprising:

a storage device including a storage medium, wherein the storage device stores computer usable program code; and a processor, wherein the processor executes the computer usable program code, and wherein the computer usable program code comprises:

computer usable code for providing a set of software patches via an automation engine acting as a proxy for a patch provider, each software patch in the set correcting at least one problem by modifying at least one software product;

computer usable code for selecting a subset of the patches and at least one target entity for each selected patch according to a vulnerability catalogue, the vulnerability catalog being maintained external to the code execution target entities and providing a listing that a target entity is exposed to a problem corrected by a software patch, the listing indicating a nature of the problem to which the target entity is exposed, the listing identifying that the software patch should be applied to the target entity;

computer usable code for building a distribution plan using the automation engine, wherein for each selected patch the distribution plan includes an activity for applying a software package on the corresponding target entities, the software package installing the selected patch when applied, wherein at least one of the selected patches is a serial patch requiring a deferrable rebooting for installation, for such at least one of the selected patches, the step of building the distribution plan further including:

for each serial patch, adding an activity for applying a corresponding serial software package without rebooting a corresponding target entity; and adding an activity for rebooting the target entity in response to the application of all the serial software packages;

computer usable code for submitting the distribution plan for execution, causing each entity to be scanned for determining whether each entity is exposed to a problem corrected by any of the selected subset of patches; and computer usable code for updating the vulnerability catalogue according to the result of the scanning.

18. The data processing system according to claim 17, wherein the nature of the problem to which the target entity is exposed is a vulnerability due to a gap in data security at the target entity.

* * * * *